United States Patent [19]

Swartwout

[11] Patent Number: 4,647,801
[45] Date of Patent: Mar. 3, 1987

[54] ELECTRIC MOTOR BACK-STOPPING DEVICE

[75] Inventor: Richard J. Swartwout, Penn Laird, Va.

[73] Assignee: Dunham-Bush, Inc., West Hartford, Conn.

[21] Appl. No.: 771,745

[22] Filed: Sep. 3, 1985

[51] Int. Cl.⁴ ............................................ H02K 7/118
[52] U.S. Cl. .................................... 310/41; 188/82.77; 310/77
[58] Field of Search ................ 188/82.34, 82.7, 82.77, 188/181 R, 185; 192/12 B; 310/41, 47, 100

[56] References Cited

U.S. PATENT DOCUMENTS 2,673,939  3/1954  Tetro ..................................... 310/41

Primary Examiner—Mark O. Budd
Assistant Examiner—D. L. Rebsch
Attorney, Agent, or Firm—Sughrue, Mion, Zinn, Macpeak & Seas

[57] ABSTRACT

A back-stopping device rotor assembly is coupled to a motor shaft to rotate therewith and include a pair of L-shaped flyweights pivotably mounted to a channel crossbar, on respective sides of a motor shaft, which crossbar rotates at right angles to the shaft axis. The flyweights are pivotably mounted to the crossbar at points closer to their end facing the motor housing at positions regularly spaced from the shaft while extending parallel to the shaft, with the motor rotor at rest. A bracket mounted on the motor housing to one side of the shaft supports a stop relative to the shaft borne device rotor such that when the motor rotates at high acceleration in a first forward direction, the flyweights pivot during initial rotation to positions such that their ends proximate to the stops sweep through a stop recess and do not impact the stop. Low acceleration, backward rotation of the motor shaft up to a maximum of 180° on the first rotation causes one of the flyweights to engage the stop adjacent the recess to prevent further backward motor shaft rotation. The device has application both to single phase, permanent, split capacitor motors, and three-phase motors.

8 Claims, 4 Drawing Figures

ELECTRIC MOTOR BACK-STOPPING DEVICE

FIELD OF THE INVENTION

This invention relates to electrical motors subject to backward rotation caused by torque load reversal on the motor shaft during any time the motor is turned off, where torque reversal is produced by fans, gears, belts, etc. or other motor shaft connected device and more particularly to a back stopping device for such motors.

BACKGROUND OF THE INVENTION

The electric motors drive shaft-mounted propeller fans for moving air through air-cooled condenser coils, in air conditioning and refrigeration packages, for instance, operate as many as 10 fans on the package with the fans applied in step multiples. The fans are operated in steps to control the refrigerant pressure in the condenser. It is common for some fans to be operating while others are idle. Backflow of air through idle fans often causes them to "windmill" in the reverse direction. Ambient winds can also cause windmill of idle fans.

If the electric motors are single-phase permanent split capacitor motors, they will startup in the wrong direction, if they are already rotating in the wrong direction when power is applied. This causes the power fan attached to the motor to move air in the wrong direction and in the environment of use in air conditioning and refrigeration packages, by so doing, causes excessive condensing pressure in the unit, resulting in shutdown upon safety high pressure cutout.

If the electric motors are three-phase motors, they will not startup in the wrong direction, if rotating in the wrong direction when power is applied. However, when power is applied, they will come to a stop very quickly and immediately proceed to accelerate in the correct direction. This rapid transition from backward or wrong to forward or right direction produces an excessive torque load at the prop fan attachment point and fans have been known to shear hubs and blades due to this torque. Such a fan blade, in all likelihood, would be destroyed if the three-phase motor was started while it was spinning in the wrong direction.

Fan back-stops have been proposed using a roller clutch, hardened steel sleeve pressed onto the motor shaft and an outer sleeve prevented from rotating by a radius rod tied to the motor frame to prevent its rotation. While such devices may have utility, the devices involve relatively rotating parts in contact with each other, constituting a bearing device requiring lubrication, and are fairly complicated and relatively expensive.

It is, therefore, an object of the present invention to provide an electric motor back-stopping device which effectively prevents backward rotation of an electric motor caused by torque load reversal on the motor shaft during any time the motor is turned off, which device is essentially frictionless, is free of relative motion between parts during continuous motor ON or OFF cycle, needs no lubrication, is not affected by atmospheric particulates, imposes no measurable load on the motor shaft, works in any position, and is quite inexpensive.

SUMMARY OF THE INVENTION

The present invention constitutes an electric motor back-stopping device which comprises a device rotor assembly attached to the end of a motor shaft projecting from the electric motor casing. The device consists of twin flyweights mounted via a holder assembly which spins with the motor shaft and which runs clear of any contact with other stationary parts of the motor during motor operation by centrifugal force moving the flyweights from floating alignment to clearance position relative to a bracket stop during the first second of motor startup at high acceleration in the forward direction and over a partial rotation of the motor shaft. With the motor stopped, gravity acts on the twin flyweights to reposition them relative to said bracket stop fixed to the stationary motor housing. Any backward rotation of the motor shaft at low acceleration, up to a maximum of 180 degrees on the first rotation, causes one of the flyweights to engage the bracket stop and prevent further backward motor shaft rotation.

The crossbar is operatively fixed to the motor shaft at right angles to the shaft axis and has portions projecting radially outward from opposed sides of the shaft, which portions pivotably mount, respectively, twin, rectangular bar flyweights for rotation about axes at right angles to the shaft axis, radially outboard of the motor shaft respectively to opposite sides of the shaft. The flyweights are pivoted other than at their centers with the shorter ends of the flyweights proximate to the motor casing. A stop fixably mounted to the motor casing is positioned such that during normal rotation in the "right" direction, the axially inner ends of the flyweights move under high acceleration by centrifugal force out of alignment and oblique to each other so as to swing wide of the stop while, any backward rotation of the motor shaft under low acceleration causes one of the flyweights to engage the stop prior to pivoting to that oblique position and thereby preventing further backward motor shaft rotation. Preferably, the motor axis is vertical and the back-stop device mounted to the bottom of the motor with the paired flyweights L-shaped.

The device may comprise a device rotor assembly in which the device crossbar is of U-shaped channel configuration with the base coplanar to the end of the motor casing and at right angles to the motor shaft axis. Paired slots within the crossbar base receive the flyweights, which project therethrough, and aligned holes within the opposed arms integral with the base and projecting parallel to each other from the base bear pivot pins, which pins pass through the flyweights for rotatably mounting the flyweights. A bolt passing through a hole within the center of the device rotor assembly crossbar and through a cylindrical spacer may be threaded to the end of the motor shaft projecting from the motor casing to mount the device crossbar and flyweights, as a subassembly, to the motor shaft.

A device bracket assembly may consist of a unitary Z-shaped bracket strap, including a base mounted at its ends to motor bolts borne by the motor casing, the bracket strap including an integral plate-like stop to the side of a base facing the bracket straps and the electric motor shaft. The stop may be of generally rectangular plate form with a concave, circular recess within the corner of the stop remote from the bracket strap and facing the device assembly rotor crossbar, whereby initial, high acceleration rotation of the motor shaft in the right direction causes axial inner the end of the flyweights proximate to the motor casing to sweep across the recess of the stop without contacting the stop while, during the initial, low acceleration, backward rotation of the motor shaft up to a maximum of 180°, one of the flyweights engages an edge the stop adjacent to the recess to prevent continued back rotation of said selective motor shaft.

DESCRIPTION OF THE PREFERRED EMBODIMENT

Figure 2:
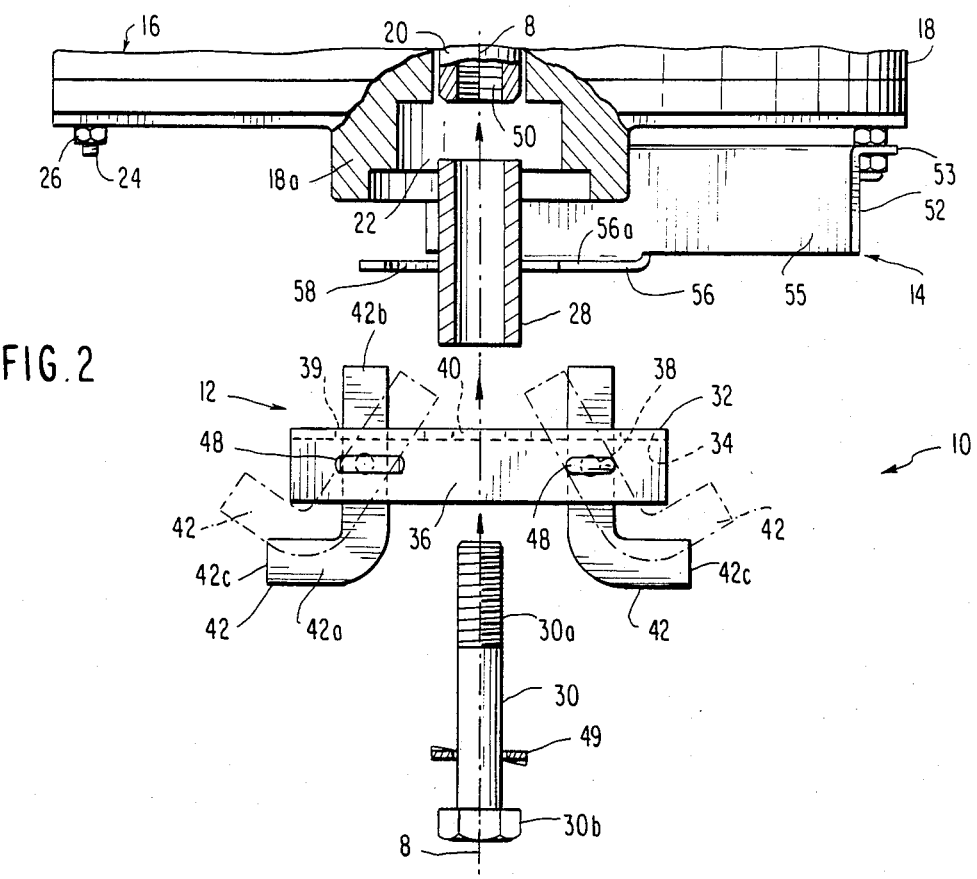
FIG. 2 is an exploded side elevational view, partially in section, of a portion of the motor and electric motor back-stopping device of FIG. 1.

Referring to the drawings, the electric motor back-stopping device forming a preferred embodiment of the present invention is indicated generally at 10 and consists essentially of two components, a back-stop device rotor assembly indicated generally at 12 and a back-stop device bracket assembly indicated generally at 14. The electric motor back-stopping device 10 is physically mounted to an electric motor, preferably with its axis 8, indicated generally at 16, vertical. The motor 16 may be an electric motor driving a shaft-mounted propeller fan (not shown) for moving air through an air-cooled condenser coil in an air conditioning or refrigeration package (not shown). The electric motor 16 includes an electric motor housing or casing 18 bearing internally a fixed stator (not shown) concentrically mounted relative to an electric motor rotor (not shown) on motor shaft 20. Shaft 20 in FIG. 2 at the bottom of the motor, terminates short of motor housing 18, and particularly housing hub 18a defines a circular hole 22 sized larger than shaft 20, through which access to the bottom end of the shaft may be had. Further, the electric motor includes a number of motor bolts 24 which pass through the motor housing with their threaded ends terminating exterior of the housing 18, and bearing nuts 26.

In the illustrated embodiment, the back-stopping device rotor assembly 12 is mounted to motor shaft 20 through the utilization of a cylindrical sleeve or spacer 28 and a mounting bolt 30 passing therethrough. Further, the electric motor back-stopping device rotor assembly 12 comprises a channel shaped rotor crossbar 32 including a horizontal base 34 and paired integral right angle vertical arms 36, which extend parallel to each other and downwardly from the base 34. The arms 36 bear small diameter holes as at 38 adjacent their outboard ends, which holes of respective arms are aligned. In addition, the base 34 includes a pair of rectangular slots 39 to each side of central circular hole 40 through which mounting bolt 30 projects, hole 40 being sized in excess to bolt 30.

Pivotably mounted to the channel shaped rotor crossbar 32 is a pair of elongated L-shaped, rectangular bar flyweights 42. The flyweights 42 are composed of base portions 42a and integral right angle legs 42b. Legs 42b include small diameter holes passing through their centers, as at 44, sized to the holes 38 within arms 36 of the channel bar rotor 32. Cotter pins 48 pass through aligned holes 38 within the crossbar arms 36 and the holes 44 within the flyweight legs 42b such that the flyweights pivot about axes 39 which are at right angles to the longitudinal axis of the flyweight legs, and additionally at right angles to the axis 8 of motor shaft 20. Purposely, the flyweight legs form flyweight ends 42 remote from the motor housing or casing 18 which have greater mass than the ends proximate to the motor housing.

In the illustrated embodiment, the device rotor assembly 12 is coupled to the motor drive shaft 20 by placing a lock tight compound on the threaded end 30a of the bolt prior to that end of the bolt being passed through a sleeve spacer 28 and threaded into a tapped hole 50 within the electric motor shaft 20. Bolt 30 is threaded down until the head 30b of the bolt clamps base 34 of the device rotor crossbar 32 against spacer 28 with the opposite end of spacer 28 tight to the motor shaft 20. Preferably an exterior tooth lock washer 49 is interposed between the head 30b of bolt 30 and base 34 of the crossbar to securely lock the stopping device channel bar rotor 36 to shaft 20 via spacer 28.

The other component of the back-stopping device 10 is bracket assembly 14. Bracket assembly 14 consists of a bracket strap 52 of sheet metal of Z-shaped cross section including a base 53 having paired holes 54 at opposite ends sized slightly larger than the diameter of motor bolts 24. This permits the bracket strap base 53 to be mounted to the exterior of the motor housing or casing 18 and to the side of the motor drive shaft 20.

Figure 1:
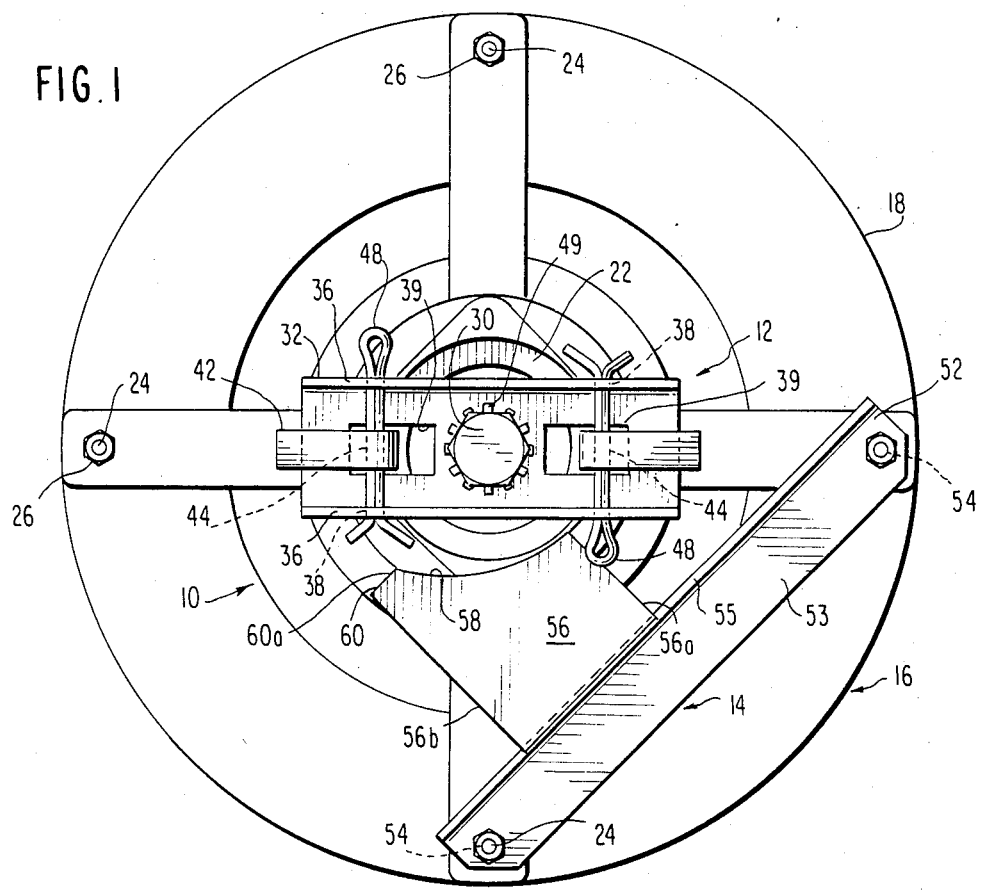
FIG. 1 is a bottom plan view of an electric motor mounting the electric mount back-stopping device forming a preferred embodiment of the present invention.

The bracket strap 52 has, offset from the plane of base 53 and integral therewith, a plate-like stop 56 connected to base 53 via integral connecting portion 55, which stop 56 projects parallel to the base 53 of the bracket strap, beneath rotor assembly 12 and perpendicular to motor shaft 20, FIG. 1. Stop 56 is not centered lengthwise on base 53, although the base 53 is centered relative to motor casing and motor shaft 20. Stop 56 is of modified rectangular configuration. It includes concave arcuate recess 58 within edge 60 remote from strap base 53, at a corner of the stop proximate to electric motor shaft 22. Recess 58 extends into side 56a of the strap which side 56a is generally aligned with the axis 8 of the electric motor shaft 20 and extends toward the opposite side 56b but terminates short thereof. Preferably, arcuate recess 58 has a radius of curvature defined by a radius which is larger than the radius from recess 28, at edge 56a, to the axis 8 of motor shaft 22. This creates a flat portion 60a of the edge 60 of the stop radially to one side of the concave recess 58 leaving a flat edge portion 56a to the other side of the same recess 58, and 90° to flat edge portion 60a.

Figure 3:
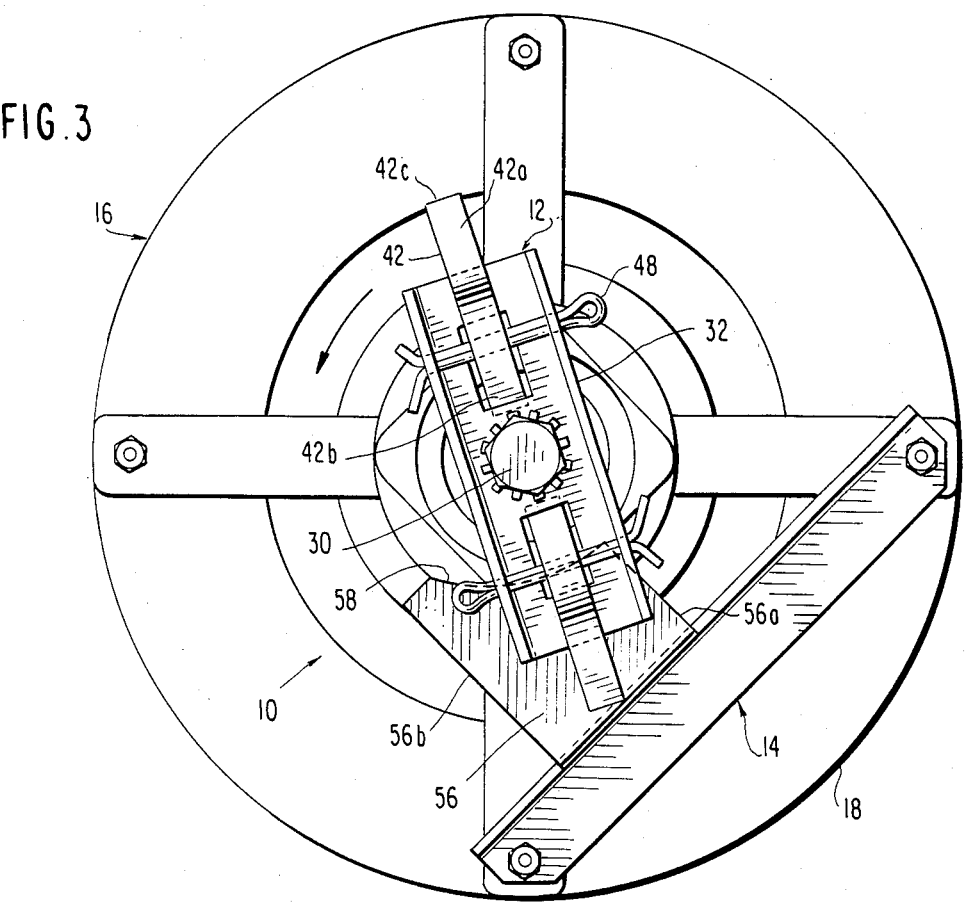
FIG. 3 is a further bottom plan view of an electric motor and an electric motor back-stopping device of FIGS. 1 and 2 under normal running conditions with the motor rotating in the right direction.

There is a specific relationship between the configuration and the stop 56 and the pivotably mounted flyweights of the back-stopping device rotor assembly 12. The channel shaped crossbar and cotter pins function as a holder assembly for the twin flyweights 42 which holder assembly spins under high acceleration with the motor shaft when the motor starts to rotate in the forward direction. As may be seen in contrast between FIGS. 4 and 5, when the device rotor assembly 12 accelerates quickly counter-clockwise in FIG. 3, the twin flyweights 42 pivot from positions where legs 42b are parallel to the axis of the rotor 20 to positions where those legs are oblique, and the outboard base portions 42b move under centrifugal force away from each other while their inboard ends, proximate to casing 18, pivot towards each other. When starting in the forward (counter-clockwise) direction, when viewed from the bottom, the flyweight legs 42b rapidly move towards the axis 8 of rotation of shaft 20 and are able to sweep past, but in close proximity to, the arcuate recess surface 58 of stop 56. The eccentric nature of the recess 58 permits the recess to cam the legs 42b into oblique position relative to shaft axis 8. When motor operation terminates, gravity acts on the twin flyweights to reposition them relative to the bracket 56 with bases 42a into positions of generally longitudinal alignment with each other and perpendicularly to the axis of the motor shaft 20.

Figure 4:
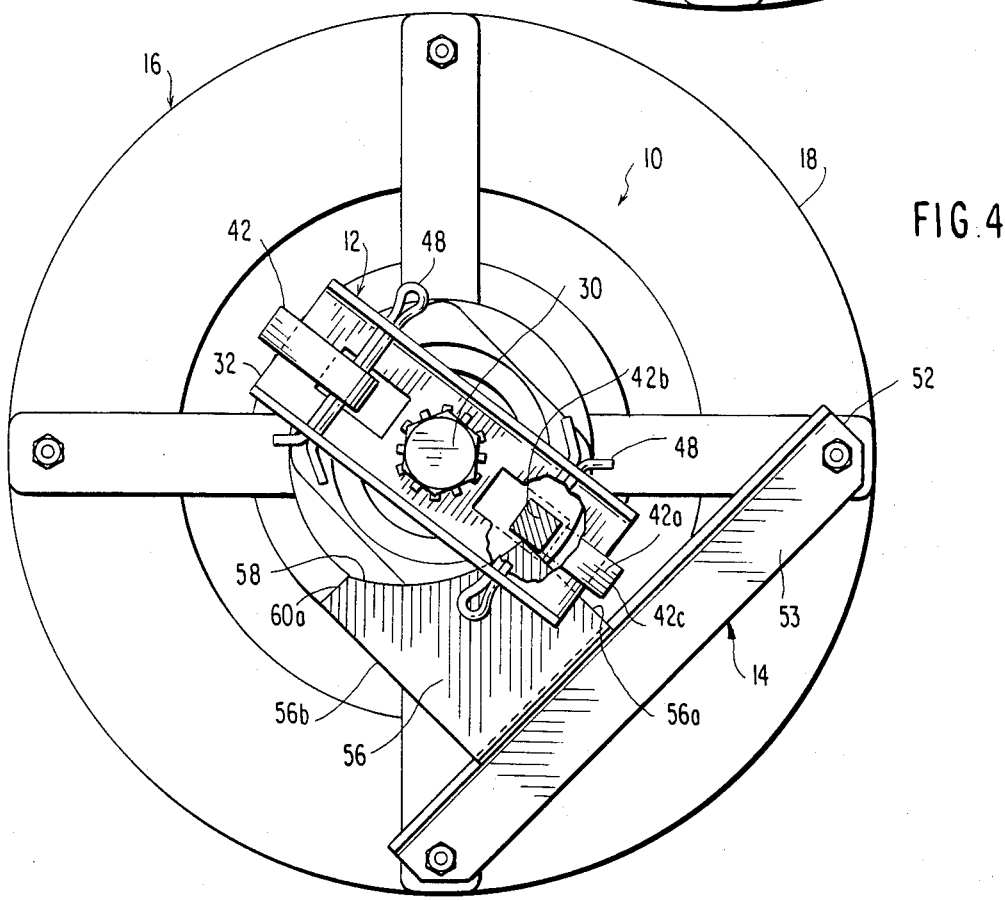
FIG. 4 is a bottom plan view similar to that of FIG. 3, during momentary, slow, backward rotation of the motor shaft causing flyweight engagement with the stop.

However, any slow, backward rotation of the motor shaft 20 up to a maximum of 180 degrees on the first rotation (whether caused by incorrect reverse motor drive rotation or ambient air acting on the fan blade [not shown] fixed to motor shaft 20) causes inboard legs 42a of one of the flyweights 42 to engage flat edge 56a of the stop 56 as a result of that clockwise rotation, FIG. 4, terminating such backward motor shaft rotation.

This action will result whether the motor 16 is a single-phase permanent split capacitor motor which can and may startup in the wrong direction, i.e., counter clockwise as shown in FIG. 4, or where such motor 16 is a three-phase motor, to insure, after termination of motor operation in the right direction, that the motor cannot continue to rotate in the wrong direction. Thus, the back-stopping device 10 assures that the motor fans (either single-phase or three-phase) are stationary when the power is applied to the motor, so that neither incorrect power rotation nor fan blade destruction can occur.

In contradiction to the prior art fan motor back-stop devices employing a roller clutch system, the back-stop device of the present invention is essentially frictionless, there is no relative contact between parts during continuous motor ON or OFF cycle, no lubrication is required and the components are not affected by atmospheric particulates and imposes no measurable load on the motor shaft. The device works with the motor in any position, although preferably when its axis is vertical, with contact made up to a maximum of 180° on the first backward rotation to positively stop the shaft and prevent further backward shaft rotation. Additionally, the device is simple and inexpensive to manufacture, and easy to install. Further, while the illustrated embodiment utilizes a rotor assembly requiring a bolt 30, lock washer 49 and spacer 28, as well as a tapped hole 50 within the electric motor shaft 20, other techniques may be employed to mount the device rotor crossbar to the motor shaft. The motor bolts 24 of electric motor 16 are long enough to permit the installation of paired nuts 24 sandwiching the bracket strap 52, FIG. 1, however, if the motor bolts are too short and in the wrong direction to install the back-stop bracket strap 52, the motor bolts may be replaced with two threaded rods which may be supplied in kit form. Typically, a fan motor is provided with a tapped shaft end, the shaft end is internal of the motor housing 18 and the hole 22 is normally covered by a dust cap (not shown) which, if present, should be removed and discarded to permit device assembly.

For various fan motors, the rotor assembly channel shaped rotor crossbar 32 may be mounted directly to the projecting motor shaft 20 externally of the motor casing 18 and the bracket assembly 14 mounted to the motor casing via the motor bolts or by similar means so that bracket stop 56 is correctly positioned facing the rotor assembly 12, with stop 56 offset relative to the axis of rotation of the device rotor crossbar 32 and under conditions where legs 42b of the flyweights 42 sweep past the arcuate concave recess 58 immediately facing the device rotor assembly 12 during rotation in the forward direction.

While the invention has been particularly shown and described with reference to preferred embodiments thereof, it will be understood by those in the art that various changes in form and details may be made therein without departing from the spirit and scope of the invention.

What is claimed is:

1. An electric motor back-stop device for preventing rotation of an electric motor shaft in the backward direction, said electric motor including a casing, a rotor shaft carried by said casing for rotation about the shaft axis, said device consisting of a holder assembly operatively coupled to said motor shaft for rotation therewith, and including twin flyweights pivotably mounted to opposite sides of the shaft and radially outwardly thereof a stop fixably mounted to said motor casing in proximity to said holder assembly flyweight, such that said flyweights pivot under centrifugal force as a result of high acceleration of the motor rotor shaft during motor startup in the forward direction to a clearance position relative to said bracket stop during the first second of motor startup and over a partial rotation of the motor shaft and wherein, during motor stoppage, gravity acts on the twin flyweights to reposition them relative to said bracket stop and wherein further, said backward rotation of the motor shaft up to a maximum of 180° on the first rotation at low acceleration causes one of the flyweights to engage the bracket stop to prevent further backward motor shaft rotation.

2. The electric motor back-stopping device as claimed in claim 1, wherein said holder assembly comprises a crossbar operatively coupled to said motor shaft at right angles to the shaft axis exterior of the motor casing and having diametrically opposed portions projecting radially outwardly from opposite sides of said shaft and wherein, said flyweights comprise twin, rectangular bar flyweights pivoted to respective crossbar portions intermediate of their ends for rotation about axes at right angles to the shaft axes and at right angles to the axis of the crossbar, radially outboard of the motor shaft and to respective opposite sides of said shaft.

3. The electric motor back-stopping device as claimed in claim 2, wherein the pivot axis for the flyweights is such that said flyweights define flyweight shorter ends proximate to the motor casing.

4. The electric motor back-stopping device as claimed in claim 1 wherein the electric motor axis is vertical, the back-stopping device is mounted to the bottom of the motor and wherein the twin, rectangular bar flyweights are L-shaped including legs extending parallel to the axis of the motor shaft and right angle base portions remote from the motor casing with said base portions angled outwardly, away from said motor axis.

5. The electric motor back-stopping device as claimed in claim 2 wherein said device crossbar is a U-shaped channel configuration including a base coplanar to the end of the motor casing and at right angles to the motor shaft axis, wherein paired slots are provided within the crossbar base and receive the flyweights which project therethrough and wherein, said crossbar base includes opposed arms integral with the base and projecting parallel to each other and wherein, said opposed arms include aligned holes within the ends thereof and said flyweights include holes passing therethrough and pivot pins passing through said aligned holes within the opposed arms of said U-shaped channel crossbar and through the holes of said flyweights for pivotably mounting said flyweights to said crossbar.

6. The electric motor back-stopping device as claimed in claim 5 further comprising a bolt hole within the center of said device rotor assembly crossbar base, wherein said electric motor shaft includes a tapped hole in the end thereof proximate to said casing bearing said back-stopping device rotor assembly and wherein, said assembly further comprises a cylindrical spacer and a bolt passing through the hole within the center of the crossbar base, through said cylindrical spacer and being threaded to the tapped end of the motor shaft for fixably mounting the device crossbar and flyweights to said motor shaft for rotation therewith.

7. The electric motor back-stopping device as claimed in claim 5, wherein said device bracket assembly consists of a unitary Z-shaped bracket strap including a base, means for fixably mounting said base at opposite ends to motor bolts projecting outwardly of the casing, said bracket strap including an integral plate-like stop to the side of the base facing the electric motor shaft, said stop being of generally rectangular plate form and having a concave circular recess within an edge at a corner of the stop remote from the bracket strap base and proximate the assembly rotor crossbar and wherein, said plate and said concave circular recess is sized such that upon initial, high acceleration rotation of the motor shaft during initial startup in the forward direction the axial inner ends of the flyweights proximate to the motor shaft sweep across the recess of the stop without contacting the stop adjacent to the recess while, during initial low acceleration backward rotation of the motor shaft up to a maximum of 180°, one of the flyweights engage the stop adjacent to said recess to prevent adjacent the recess to prevent continued backward rotation of said motor shaft.

8. The electric motor back-stopping device as claimed in claim 7, wherein said concave, circular recess has a radius which is in excess of the distance between the center of the axis of the motor shaft and a point on said concave recess thereof closest to the shaft axis and wherein, the concave, circular recess is eccentric relative to the shaft axis under conditions where, with the shaft rotation in the forward direction the ends of the flyweights proximate to the motor casing sweep across the concave, circular recess portion from the recess end which is most remote from the shaft axis, while during backward rotation of the motor shaft, the flyweights tend to sweep across the concave, circular recess from the recess end proximate to that shaft.

* * * * *